C. KUENTZEL.
TIRE BEAD FORMING APPARATUS.
APPLICATION FILED DEC. 18, 1915.
1,187,339.
Patented June 13, 1916.
2 SHEETS—SHEET 1.
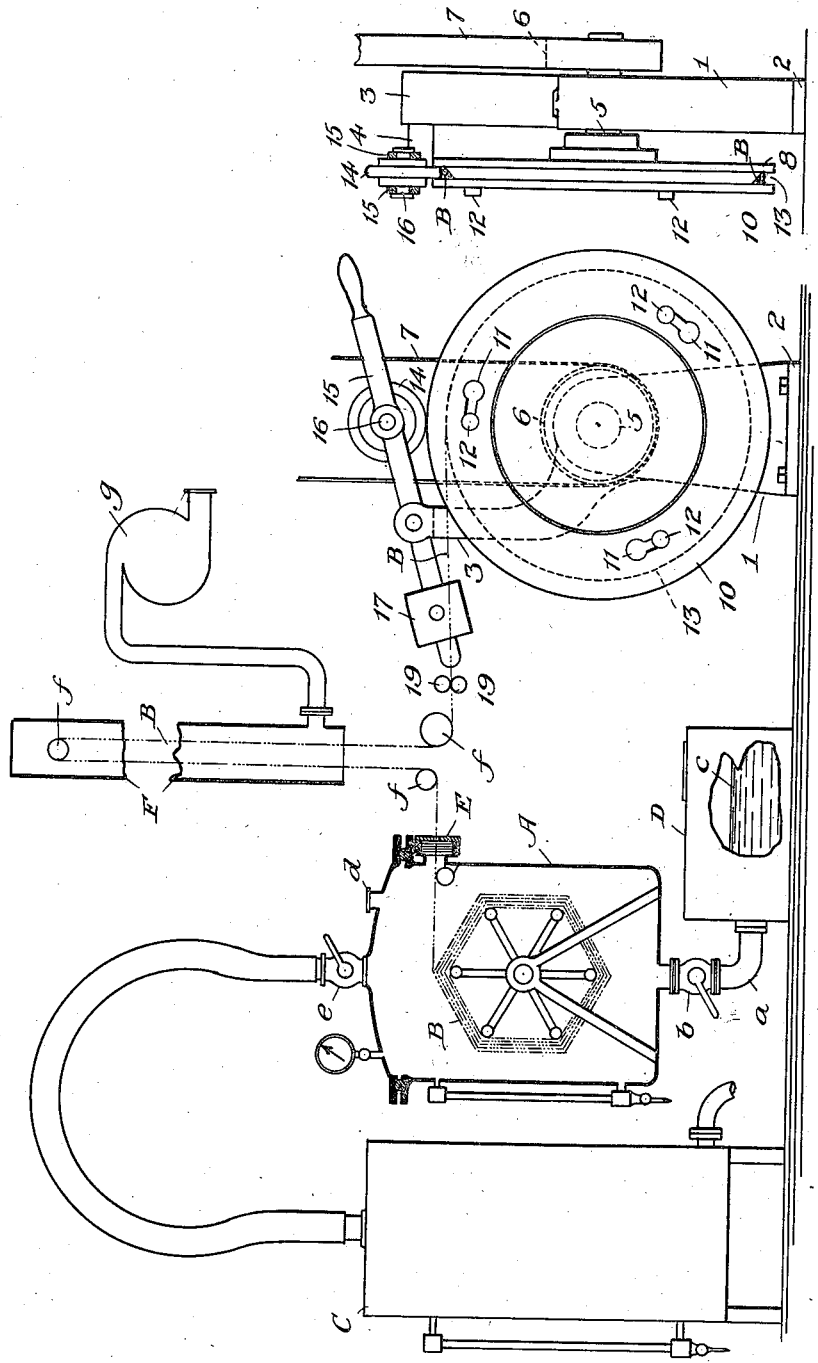
Inventor
CURT KUENTZEL
By Wm. E. Dyre.
Attorney C. KUENTZEL.
TIRE BEAD FORMING APPARATUS.
APPLICATION FILED DEC. 18, 1915.
1,187,339.
Patented June 13, 1916.
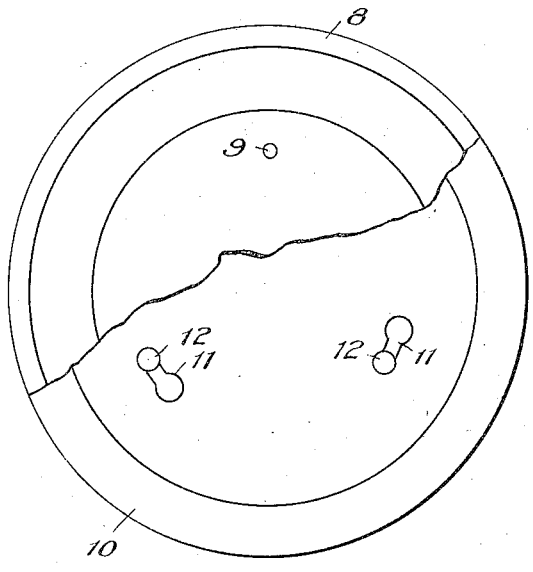
Fig. 3.
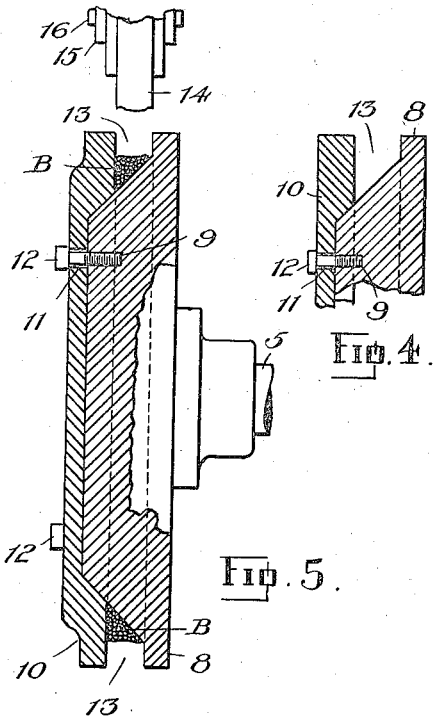
Fig. 4.
Fig. 5.
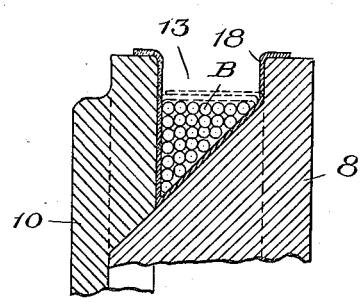
Fig. 6.
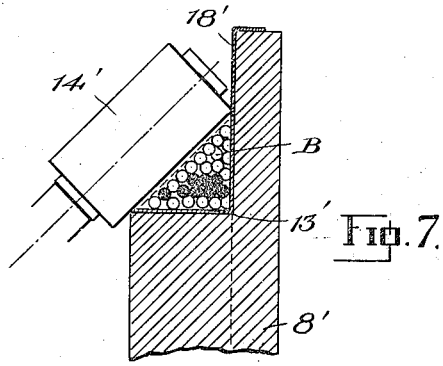
Fig. 7.
Inventor
CURT KUENTZEL
By Wm C. Dyre
Attorney

UNITED STATES PATENT OFFICE.

CURT KUENTZEL, OF YOUNGSTOWN, OHIO, ASSIGNOR TO THE REPUBLIC RUBBER COMPANY, OF YOUNGSTOWN, OHIO, A CORPORATION OF OHIO.

TIRE-BEAD-FORMING APPARATUS.

1,187,339.   Specification of Letters Patent.   Patented June 13, 1916.

Application filed December 18, 1915. Serial No. 67,557.

*To all whom it may concern:*

Be it known that I, CURT KUENTZEL, a subject of the Emperor of Germany, residing at Youngstown, in the county of Mahoning and State of Ohio, have invented certain new and useful Improvements in Tire-Bead-Forming Apparatus; and I do hereby declare the following to be a full, clear, and exact description of the invention, such as will enable others skilled in the art to which it appertains to make and use the same.

This invention relates to new and improved apparatus for forming straight side and clencher beads for use in the manufacture of automobile tires, and is designed more especially for the formation of endless tire beads the body portions of which are preferably of thread or cord-wound construction impregnated with rubber.

The invention has for an object the building of bead-cores or bodies by a continuous winding or reeling process, without the employment of ordinary mold members.

A further object is the construction of special apparatus by agency whereof the aforesaid results may be economically accomplished with speed, accuracy, and precision.

A further object of the present invention is the production of non-stretchable tire beads of uniform density and tensile strength.

With the foregoing and other objects and advantages in view the invention will be hereinafter particularly described, and then set forth in the claims following.

In the accompanying drawings which form part of this application for Letters Patent, and whereon corresponding reference characters indicate like parts in the several views: Figure 1 is a side elevation of the present invention, in conjunction with which is shown a suitable coöperating cord impregnating or saturating apparatus, the latter being partly in side elevation and partly in section. Fig. 2 is an end view of the improved bead forming apparatus. Fig. 3 is a face view of the main rotary bead mold or winding drum, made of two separable sections, and partly broken away for the purpose of disclosing the innermost of said sections. Fig. 4 is a fragmentary sectional view through one edge of the rotary bead mold. Fig. 5 is a vertical central section through the entire bead mold, showing in section also a tire bead in process of formation, and a fragment of a superposed compression roller. Fig. 6 is an enlarged fragmentary view in vertical section, corresponding with one edge of Fig. 5, but showing in addition an envelop or wrapper of frictioned fabric for inclosing the bead core after formation, and, Fig. 7 is also a fragmentary sectional view of a modified form of rotary bead mold, and a special compression roller for forming straight side beads.

Reference being had to the drawings, the letters and numerals thereon, A indicates an air-tight closed tank or vacuum chamber constituting part of suitable cord-impregnating and drying mechanism, also of my invention. This latter mechanism is not herein claimed, for the reason that it forms the subject matter of a separate application for Letters Patent, Serial No. 760,515, now pending in the United States Patent Office. It is capable of independent use, or is most admirably adapted for coöperation with my present bead forming apparatus, and for the latter reason will now be briefly described. Within the said tank A there is located, as shown, a skein of bead-forming material such as thread or cord B for use in building tire beads, capable of being exposed to a vacuum produced by any well known means, such as condenser C. Adjacent to the said tank A, and connected thereto by a supply pipe $a$, equipped with a controlling valve $b$, there is provided a suitable receptacle D for rubber cement or cord-impregnating material $c$ so compounded as to render it exceedingly hard when vulcanized. Valve $b$ being now opened it is obvious that rubber solution or cement $c$ will flow freely from receptacle D into the tank or chamber A so long as a partial vacuum is maintained therein, and the said valve $b$ remains open, to wholly or partially submerge the aforesaid skein of cord B for the purpose of saturating it. When desired, this saturating or impregnating operation may be augmented by air pressure from any suitable compressor (not shown) introduced into the tank A by way of hose attachment $d$ after outlet valve $e$ as well as the inlet valve $b$ have first been closed.

Passing out of tank A through a diaphragm E, cord B is conducted over guiding sheaves $f$, through a suitable drying pipe F, equipped with a blower $g$ for supplying fresh air, as shown by Fig. 1, to a pair of tension rolls which latter or equivalent means constitute a part of the present invention.

Although it should be particularly noted that any form of saturating or impregnating apparatus, such for example, as an ordinary tube machine, may be substituted for that shown, without in the least departing from the present invention, which will now be particularly described as follows: The numeral 1 indicates a main cast support or upright, bolted to a suitable bed by means of flanges 2, and provided with an uprising arm 3 having at its upper end an angular offset 4. This main support 1 is bored transversely and fitted with a journal box or bearing for shaft 5 projecting at each side thereof. Upon one end of the said shaft is mounted a pulley 6 adapted to be driven by any suitable means such as a belt 7 from a source of power, not shown; and upon the other end of the same shaft 5 there is rigidly secured, or integrally formed, one of two flanged separable rotary mold members 8 being of annular form, and of a truncated cone shape in cross section, as best shown by Fig. 5 of the drawings. The inner surface of said mold member 8 is topped by bolt holes 9 as a means of readily and securely attaching a second coöperating mold member 10 of corresponding diameter and circular form. The latter, however, is configured upon its inner surface by a circular depression which is designed and adapted to neatly receive the truncated end or apex of the aforesaid mold member 8; and is further provided with a series of key-hole slots 11 through which bolts 12 project into their respective bolt holes 9. In assembling or separating these rotary mold members 8 and 10, bolts 12 are not removed, but obviously the enlarged ends of slots 11 permit passage of the said bolt heads, whereupon a relative rotary movement of the said mold members secures them together in a well understood manner; and, if it be desired to fasten them even more effectually a turn of the connecting bolts suffices to accomplish this result. When constructed and assembled substantially as set forth the aforesaid members 8 and 10 collectively constitute a rotary bead mold, having an angular peripheral packing groove 13, as shown by Fig. 4, adapted and intended to receive windings of a bead-forming material such as the thread or cord B during the operation of bead forming. In vertical alinement with the said packing groove 13 is a compression roller 14 pivotally mounted upon a hand lever 15 as at 16, and adapted to enter groove 13 as shown by Fig. 2. This lever 15 is pivotally mounted upon the angular offset 4 of arm 3, and may be counterweighted as at 17 for the purpose of normally holding the compression roller or wheel out of, and above the packing groove 13. And, as clearly indicated by Fig. 6, the said groove 13, during the operation of bead forming, is first lined with a strip of frictioned fabric 18 throughout its entire circumference, this strip, as shown by dotted lines, being finally folded over the bead core or body to become a part of the finished product as will later appear. Obviously, the cross sectional area and form of tire beads may be varied indefinitely to meet special conditions and tire requirements, by merely varying the shape of the peripheral groove 13, as for example, straight side heads may readily be produced by a modification of parts such as shown by Fig. 7, in which the rotary mold member 8' is provided with a peripheral groove 13' of right angular form, wherein a lining 18' is employed, the compression roller 14' being of elongated shape. And, as indicated by solid black in this Fig. 7, strands or coils of wire may be interspersed with the windings of cord B when desired for purposes of strength and rigidity.

At one side of the bead forming apparatus there is provided a cord tensioning device of any approved construction, by preference, however, comprising a pair of rolls or rollers 19 in vertical alinement with groove 13 of the rotary bead mold.

In practical operation, cord B is taken from my improved cord impregnating apparatus as shown by Fig. 1 of the drawings, or from an ordinary tube machine, or from any suitable rubber coating device, to the tension rolls 19, and thence directly into the peripheral groove 13 of the rotary bead mold, where by reason of its adhesive coating the end is caused to adhere to the inner surface of the frictional fabric lining 18. The rotary bead mold is then started and revolved rapidly in one direction until a sufficient amount of thread or cord B has been coiled thereon, within the envelop or lining 18, as shown by Fig. 6, the tension device 19 in the meantime insuring a close or compact coil. During the winding or coiling operation the compression roller 14, by agency of the manually operated lever 15, is introduced into groove 13, and there firmly held for the purpose of snugly compacting the various convolutes of thread or cord B as they are applied. This accomplished, and the bead core having been thus formed, the outwardly extending edges of the friction fabric lining 18 are then folded upon themselves as shown by dotted lines in Fig. 6 thus practically completing an annular tire bead, although as a most convenient means for causing the adhesive and contacting surfaces of fabric 18 to adhere one to the other, they may be rolled into place by a final application of roller 14. A complete annular tire bead having been thus formed with a core of circumferentially arranged rubber, saturated and impregnated threads or cords, inclosed within an envelop or frictioned fabric, the same may now be removed from the rotary bead mold as follows: If bolts 12 have been screwed tightly into their respective bolt holes they are first loosened or backed off a thread or two, whereupon a slight relative rotation of the mold members 8 and 10 permits passage of the bolt heads through the enlarged ends of slots 11, and the bodily removal of member 10 in a lateral direction, thus releasing the completed bead.

The foregoing being a description of my improved bead making apparatus in one form of construction, it should be understood that the component parts thereof may be variously changed, and rearranged, without in the least departing from the spirit of my invention, and to all such changes, modifications, and equivalents I lay claim the same as if hereinbefore set forth.

Having thus described my invention what I now claim and desire to secure by Letters Patent is:

1. In a tire bead-forming apparatus the combination with a rotary bead mold provided with a packing groove of suitable configuration, of means for delivering bead-forming material into said groove, and means for permitting the removal of the completed bead in unbroken annular form.

2. In a tire bead-forming apparatus the combination with a rotary bead mold made in separable sections which combine when assembled to form the walls of a suitable packing groove, and means for delivering bead-forming material into said groove under tension.

3. In a tire bead-forming apparatus the combination with a rotary bead mold made in separable sections which combine when assembled to form the walls of a suitable packing groove, of means for delivering bead-forming material into said groove, and means for compressing such material into the form of a tire bead.

4. In a tire bead-forming apparatus the combination with a rotary bead mold made in laterally separable sections which combine when assembled to form the walls and bottom of a suitable packing groove, of means for delivering bead-forming strands into said groove, and a compression roller for packing said strands into the said groove.

5. In a tire bead-forming apparatus the combination with a rotary bead mold made in laterally separable sections which combine when assembled to form the walls and bottom of a suitable packing groove, of means for delivering bead-forming strands into said groove, a roller adapted to enter said groove for compressing said strands, and an operating lever upon which said roller is mounted.

6. In a tire bead-forming apparatus the combination with a rotary bead mold made in laterally separable interlocking sections which combine when assembled to form the walls and bottom of a suitable packing groove, and means for separating said sections in the plane of said packing groove to permit the removal of completed beads in unbroken annular form.

In testimony whereof I affix my signature, in presence of two subscribing witnesses.

CURT KUENTZEL.

Witnesses:
 FRANK DUNN,
 ETHEL JOHNSON.